United States Patent [19]

Yokoyama et al.

[11] E Patent Number: Re. 32,882

[45] Reissued Date of Patent: Mar. 7, 1989

[54] REMOTE CONTROL SYSTEM CIRCUIT BREAKER

[75] Inventors: Youichi Yokoyama, Hyogo; Hideya Kondo, Kyoto, both of Japan

[73] Assignee: Matsushita Electric Works, Ltd., Japan

[21] Appl. No.: 73,460

[22] PCT Filed: Jan. 29, 1983

[86] PCT No.: PCT/JP83/00026

§ 371 Date: Sep. 29, 1983

§ 102(e) Date: Sep. 29, 1983

[87] PCT Pub. No.: WO83/02680

PCT Pub. Date: Aug. 4, 1983

Related U.S. Patent Documents

Reissue of:

[64] Patent No.: 4,529,951
Issued: Jul. 16, 1985
Appl. No.: 551,989
Filed: Jan. 29, 1983

[30] Foreign Application Priority Data

Jan. 1, 1982 [JP] Japan ..... 57-13983

[51] Int. Cl.[4] ..... H01H 75/00

[52] U.S. Cl. ..... 335/14; 335/20

[58] Field of Search ..... 335/6, 14, 20, 8–9, 335/10, 174

[56] References Cited

U.S. PATENT DOCUMENTS

| | | |
|---|---|---|
| 2,552,427 | 5/1951 | Heidmann . |
| 2,567,018 | 9/1951 | Grob . |
| 2,671,141 | 3/1954 | Weinfurt . |
| 2,693,513 | 11/1954 | Cellerini et al. . |
| 2,693,516 | 11/1954 | Drobney et al. . |
| 3,171,921 | 3/1965 | Woods . |
| 3,171,928 | 3/1965 | Powell . |
| 3,183,325 | 5/1965 | Norden . |
| 3,193,643 | 7/1965 | Hollyday . |
| 3,211,955 | 10/1965 | Soos, Jr. . |
| 3,263,051 | 7/1966 | Gauthier et al. . |
| 3,718,875 | 2/1973 | Kussy et al. . |
| 4,164,719 | 8/1979 | Young et al. . |
| 4,167,716 | 9/1979 | Horn . |
| 4,178,572 | 12/1979 | Gaskill et al. . |
| 4,223,288 | 9/1980 | Stiner . |
| 4,292,612 | 9/1981 | Howell ..... 335/20 |
| 4,292,613 | 9/1981 | Bando et al. . |
| 4,308,511 | 12/1981 | Borona . |
| 4,400,670 | 8/1983 | Mostosi . |
| 4,449,055 | 5/1984 | Greer et al. . |
| 4,456,832 | 6/1984 | Greer et al. . |
| 4,598,263 | 7/1986 | Heyne et al. . |
| 4,604,596 | 8/1986 | Yokoyama et al. . |

FOREIGN PATENT DOCUMENTS

| | | |
|---|---|---|
| 44-27782 | 11/1969 | Japan . |
| 45-1692 | 1/1970 | Japan . |
| 45-29811 | 11/1970 | Japan . |
| 46-26901 | 9/1971 | Japan . |
| 48-38379 | 11/1973 | Japan . |
| 49-58366 | 6/1974 | Japan . |
| 50-30061 | 3/1975 | Japan . |
| 61-230214 | 10/1986 | Japan . |
| 1441135 | 6/1976 | United Kingdom ..... 335/10 |

*Primary Examiner*—E. A. Goldberg
*Assistant Examiner*—L. Donovan
*Attorney, Agent, or Firm*—Stevens, Davis, Miller & Mosher

[57] ABSTRACT

A remote control system circuit breaker which latches a trip link and a latch link by the spring force of return springs so that on- or off-hold of a movable contactor supported from the latch link depends upon a holding force of an operating electromagnet pivotally connected to a handle, thereby achieving miniaturization of the electromagnet, in turn the circuit breaker, and a saving of power consumption of the electromagnet.

5 Claims, 12 Drawing Sheets

REMOTE CONTROL SYSTEM CIRCUIT BREAKER

Matter enclosed in heavy brackets [ ] appears in the original patent but forms no part of this reissue specification; matter printed in italics indicates the additions made by reissue.

DESCRIPTION

1. Technical Field

This invention relates to a remote control system circuit breaker whose movable contactor is held on or off by virtue of a bistable electromagnetic apparatus.

2. Background Art

Conventionally, this kind of circuit breaker uses a toggle mechanism so that a handle and a movable contactor are held on or off and an operating force necessary for the handle is subjected to the maximum load at the center of handle stroke by virtue of a spring force of a toggle mechanism. Hence, in a case of driving such circuit breaker by use of a remote controlling electromagnet unit, since the attraction thereof is inversely proportional to the square of the width of the main gap, the maximum load needs be applied at the center of handle stroke, whereby the power of the electromagnetic unit should be increased. Thus, such a circuit breaker has a disadvantage in that the electromagnetic unit is large-sized, or the exciting current for the coils is increased.

Also, the conventional circuit breaker contains therein two electromagnets for serving to turn on or off the breaker, thereby having a disadvantage in that the circuit breaker is inevitably large-sized.

DISCLOSURE OF THE INVENTION

Accordingly, an object of the invention is to provide a remote control system circuit breaker which is capable of reducing the load on the remote controlling electromagnet unit and miniaturizing the circuit breaker as a whole.

This invention is characterized in that a trip link, a latch link, a movable contact, an operating link and a handle are interlocked with each other, the trip link and latch link providing return springs respectively and latched by the spring force thereof so that the on-off hold of the movable contactor supported by the latch link depends on a holding force of a bistable polarized electromagnet for remote control connected with the handle. Such construction, when no bistable electromagnet is provided, has no holding force for holding the handle on or off so that the handle operating force is equal to zero, but a spring force of a contact pressure being applied when the circuit breaker is on, and that of a return spring for the latch link when off, merely generate for force to restore the handle from the on or off position. In other words, since the handle is zero of its operating force at the center of handle stroke, the bistable type polarized electromagnet unit usable so that the attraction of its permanent magnet is set to enable the handle to be held at its on or off position against spring pressures of the contact pressure apply spring and return spring. Hence, the attraction of the electromagnet magnet for on-operation and off-operation need only overcome the latching attraction of the same. As a result, the handle may be hand-operated with a light touch and the electromagnet is subjected to less load than the conventional one to thereby be small-sized and save power consumption. Furthermore, only one electromagnet is sufficient for use to enable the circuit breaker to be largely reduced in [being applied] *physical size.*

DETAILED DESCRIPTION OF THE PREFERRED EMBODIMENT

A preferred embodiment of the invention will now be discussed in connection with FIGS. 1 through 15. At first, explanation will be given on one-polar construction, which is adapted to detect an excess current and a short-circuit current on the line and carry out a trip operation and which can control the line to be on, off and reset by means of the handle and a remote control operating signal.

Figure 6:
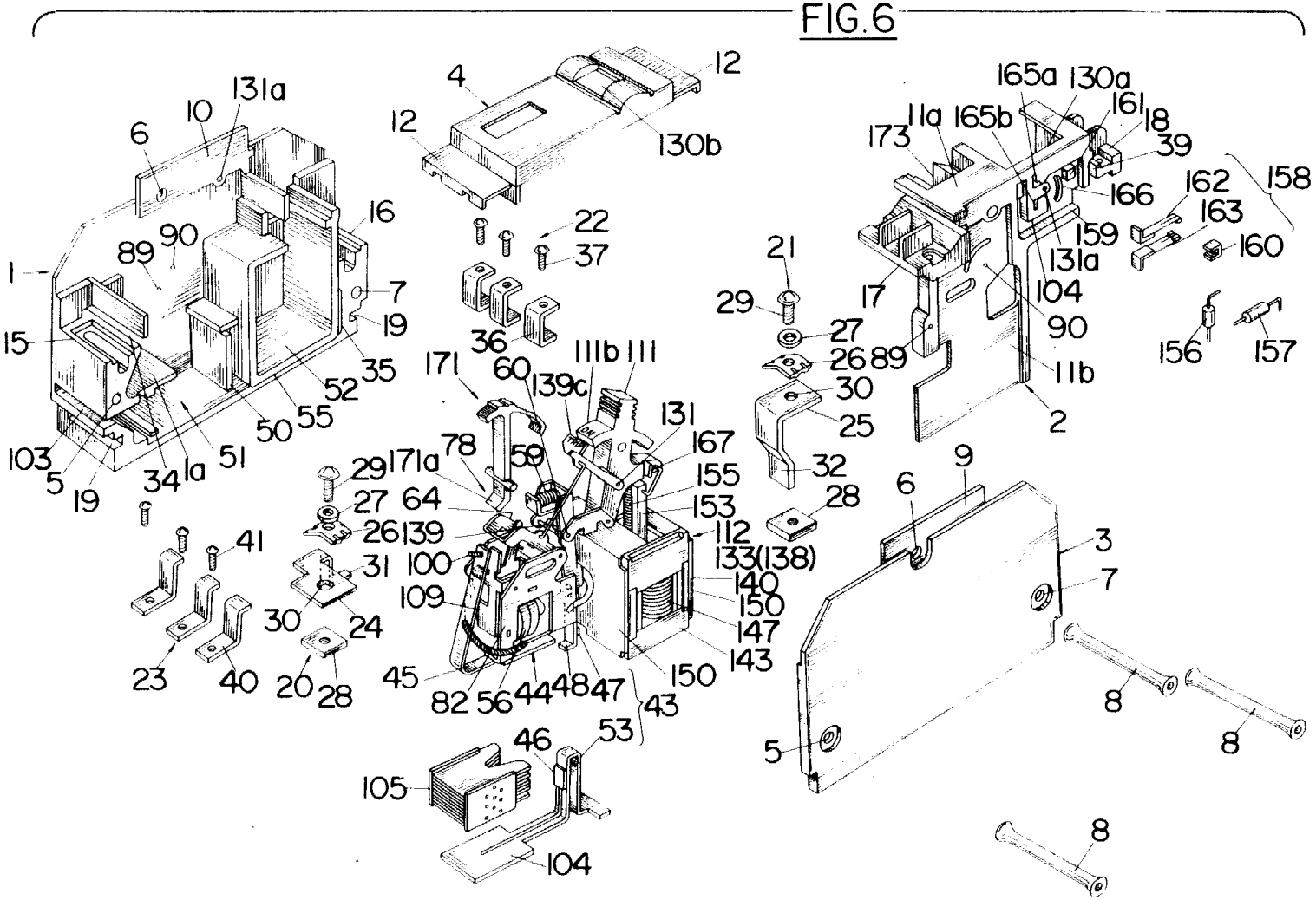
FIG. 6 is a perspective exploded view of the FIG. 1 embodiment.

A shell A (the body of circuit breaker), as shown in FIG. 6, mainly comprises a body casing 1 an inner casing 2, a side casing 3 and an upper cover 4, the inner casing 2 having a top plate 11a and an upright plate 11b and substantially closing therewith the lateral and upper openings of body casing 1, the side casing 3 covering the inner casing 2 at the outer surface thereof, so that the body casing 1, inner casing 2 and side casing 3 are integral by means of eyelet pins 8 inserted into three connecting bores 5 to 7 formed at the body casing 1 and side casing 3. The upper cover 4 of elastic plastic is attached onto mounting walls 9 and 10 at the upper ends of body casing 1 and side casing 3 and onto both side edges of top plate 11a at the inner casing 2 and has terminal covers 12 extending outwardly from both ends of upper cover 4. At the lower end of shell A is formed mounting grooves 19 at the body casing 1, which are used to mount the circuit breaker to a panel board or the like.

Terminals mainly comprise main terminals 20 and 21 for the electric lines, an operating terminal 22 for a remote control signal and an axiliary terminal therefor, the main terminals 20 and 21 comprising a terminal unit 21 at the power supply side and 20 at the load side, the terminal units 20 and 21 comprising terminal segments 24 and 25, washers 26 with holding projections, spring washers 27, square nuts 28, and terminal screws 29 respectively. The terminal segments 24 and 25 are bent at one of the side edges downwardly to form lower tongues 31 and 32 respectively, the terminal units 20 and 21 being mounted to stepped portions 15 and 16 at lower portions of both sides of shell A respectively.

The operating terminal 22 comprises U-shaped terminal frames 36 and terminal [connect] *screws* 37 to [screw] *connect* with the upper bent portions thereof and is mounted to the upper stepped portion 18 formed at the inner casing 2, the three terminal frames 36 each being inserted onto a stationary slit 39 formed at the stepped portion 18 and fixedly gripping the stepped portion 18 by means of a spring force of frame 36. The auxiliary terminal 23 comprises three terminal segments 40 and terminal screws 41 and is mounted to the upper stepped portion 17 at the inner casing 2 at a side of the load side terminal unit 20.

The electric circuit between the main terminals 20 and 21 mainly includes a contact unit 43, a plunger type electromagnet unit 44, and a bimetal 45 as shown in FIG. 6, which are disposed substantially in alignment with the main terminals 20 and 21, the contact unit 43 serving to switch the circuit and comprising a stationary contact 46 and a movable contactor 48 having a movable contact 47 and being positioned by a partition 50 which is provided upright to partition an arc extinguish chamber from an operating electromagnet housing 52.

Figure 1:
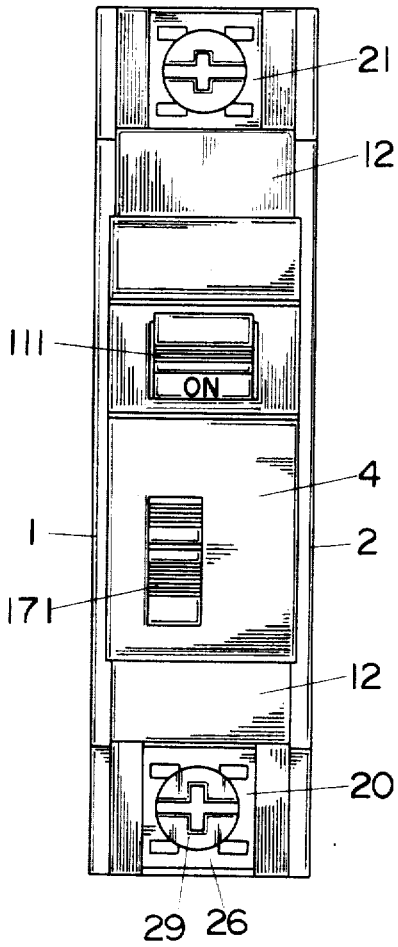
FIG. 1 is a plan view of a preferred embodiment of the circuit breaker of the invention.
Figure 2:
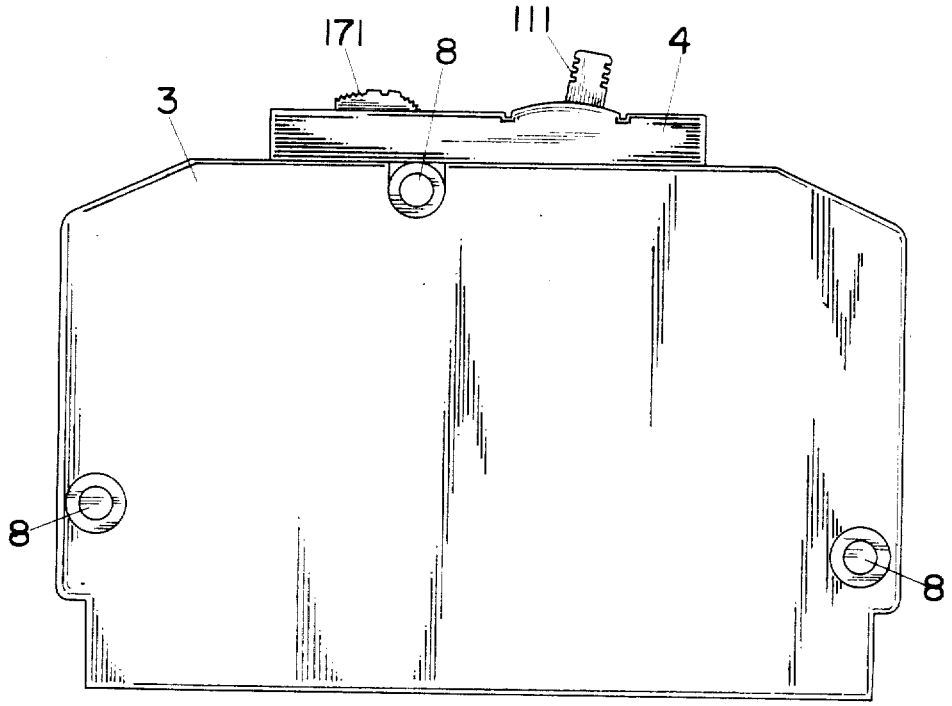
FIG. 2 is a side view thereof.
Figure 3:
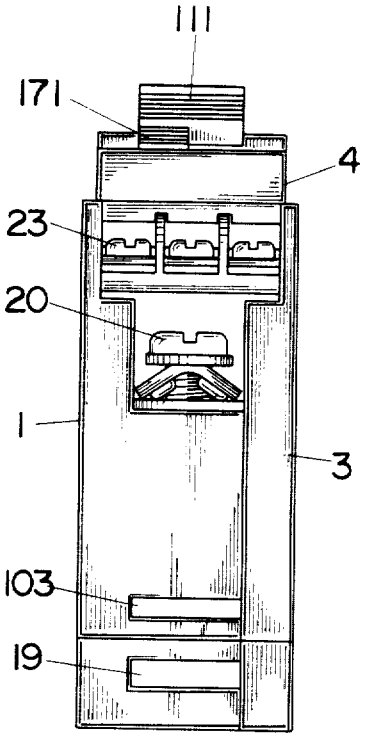
FIG. 3 is a front view of the same.
Figure 4:
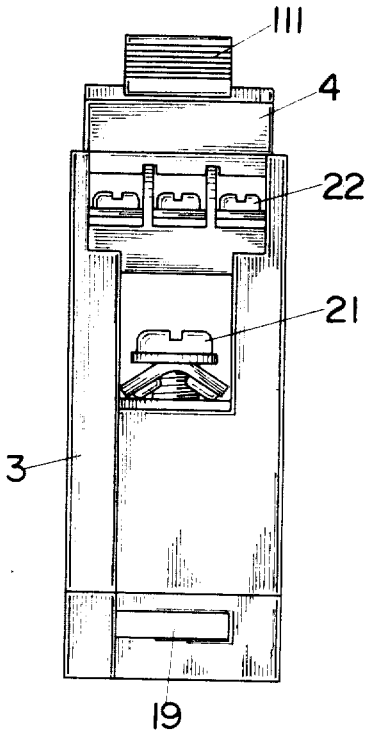
FIG. 4 is a rear view of the same.
Figure 5:
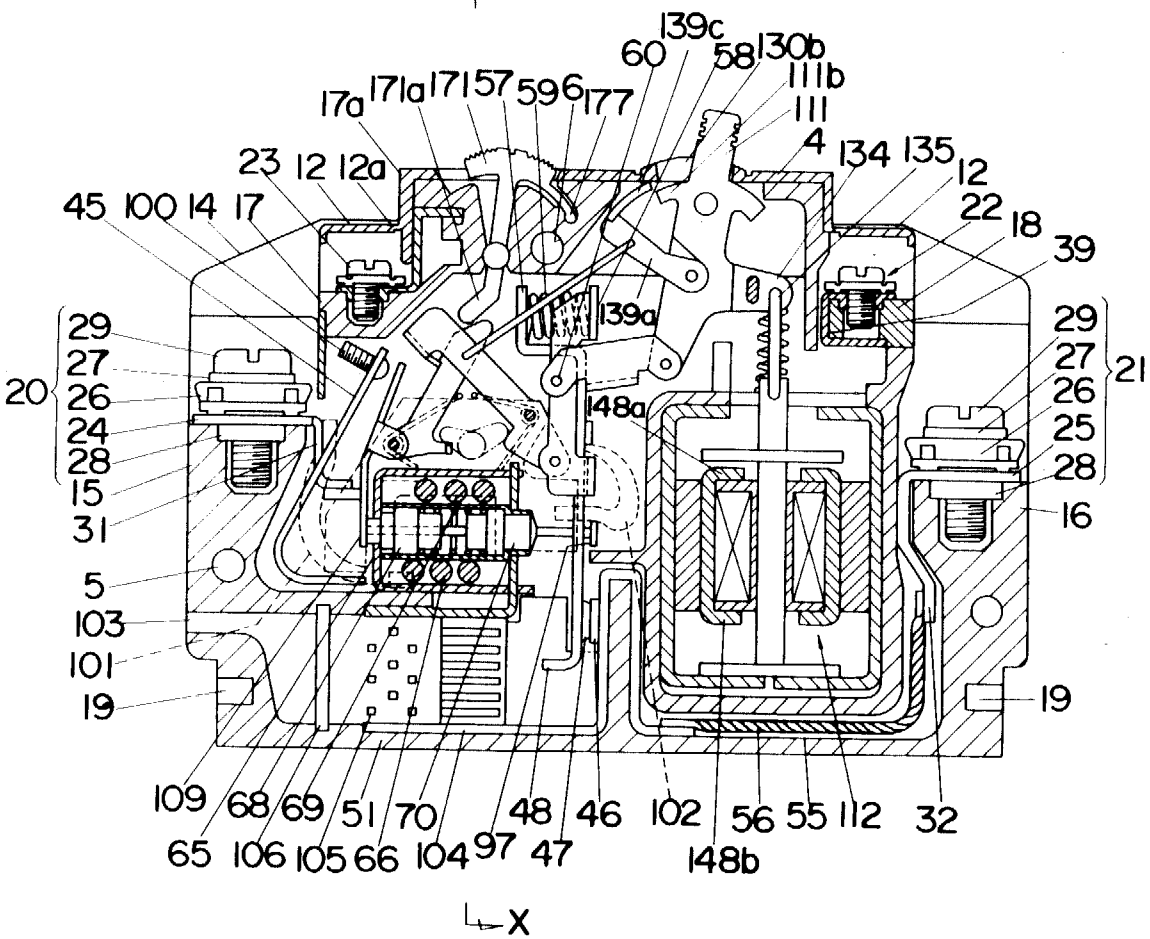
FIG. 5 is a partially sectional side view of the FIG. 1 embodiment, from which the inner casing is removed.

A slit 55 is formed under the housing 52, into which a copper stranded wire 56 or a conductive plate is inserted and connects the stationary contact segment 53 and terminal segment 25 by welding as shown in FIG. 5.

Figure 7:
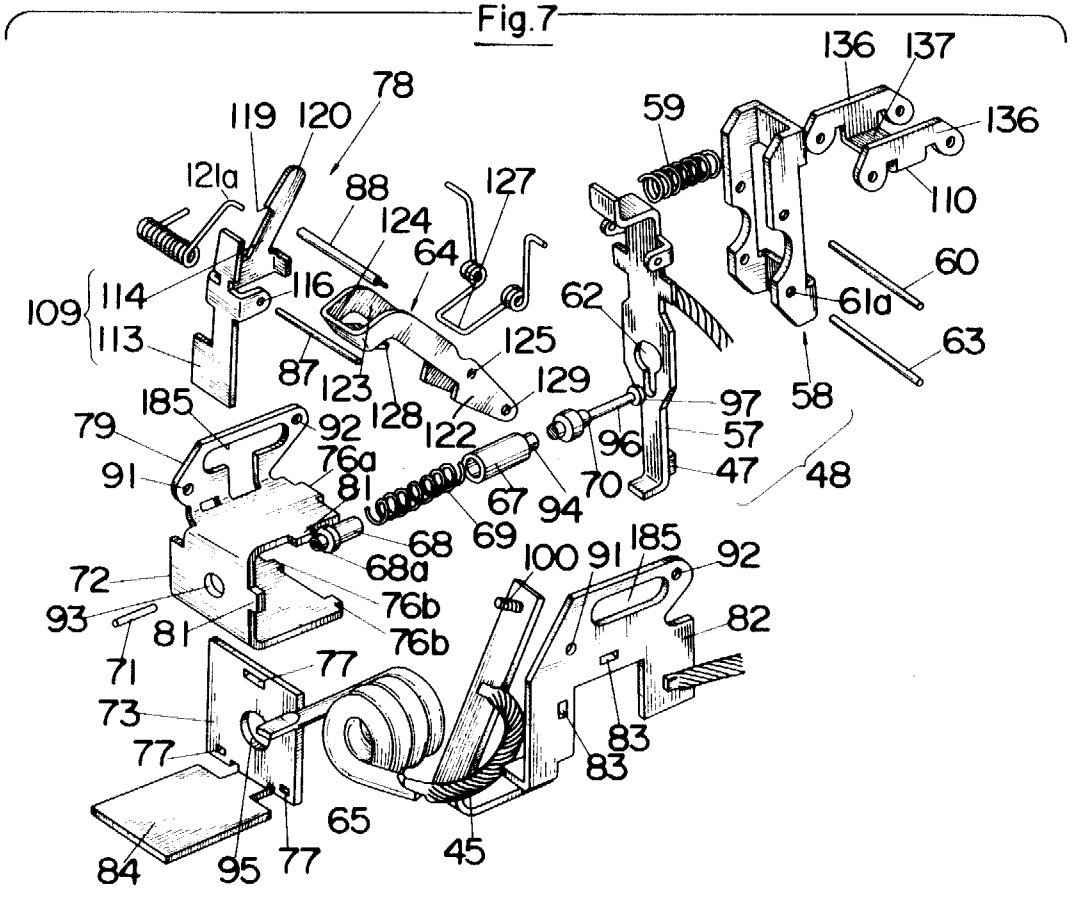
FIG. 7 is a perspective exploded view of a movable contactor, an electromagnet unit, and a mechanism.

The movable contactor 48, as shown in FIG. [12] *7*, comprises a movable contact plate 57, a contact frame 58, a contact pressure applying spring 59 and the movable contact 47, the movable contact plate 57 and contact frame 58 being pivotally connected at the upper portions thereof through a pin 60, the contact pressure applying spring 59 being provided in a compressed manner between the contact plate 57 and the contact frame 58 and above the pin 60 as shown in FIGS. 5 and 6, thereby allowing the contact plate 57 to elastically contact at an intermediate portion thereof with the lower end of contact frame 58, thus keeping the contact plate 57 in a stable condition, the movable contact 47 being fixed to the lower end of movable contact plate 57 and a keyhole-shaped bore 62 for forcibly opening the contact being formed thereat above the movable contact 47. The movable contactor 48, as shown in FIG. 7, has a support bore 61a at the lower end and above the bore 62 so that a pin 63 is inserted into the bore 61a and pivotally connecting the contact frame 58 with a latch link 64 to be discussed below, whereby the movable contact 47 contacts with the stationary contact 46 as shown in FIG. 5.

The plunger type electromagnet unit 44 serves to detect a short-circuit current and comprises a yoke 65, a coil 66, a coil bobbin 67, a stationary iron core 68, a return spring 69, a plunger 70, and a movable rod 71, the yoke 65 comprising a U-like-shaped frame 72 and an attachment plate 73 attached and fixed thereto by calking square bores 77 at the plate 73 with projections 76 at the frame 72.

Also, the yoke 65 is integral with a frame 79 for holding a mechanism 78 to be discussed below. One side-plate 82 of electric-conductive material, such as copper or copper alloy, is provided upright and opposite to the other side-plate 80 and is fitted at square bores 83 onto projections 81 at the U-like-shaped frame 72 and adhesively secured thereto. The attachment plate 73 bends at the lower end and extends therefrom to form an arc-chute plate 84 and the plunger type electromagnet unit 44 is placed on a support base 1a provided at the body casing 1, the arc-chute plate 84 contacting with the lower surface of support base 1a in a manner of sandwiching the base 1a between the electromagnet unit 44 and the arc-chute plate 84. Two pins 87 and 88 for the mechanism 78 are provided across support bores 89 at the body casing 1 and inner casing 2 and across those 90 at the same and perforate through bores 91 and 92 at the frame 79 to thereby hold the frame 79 and abut against the side plate 92 adjacent to the inner casing 2, thereby positioning the yoke 65 and frame 79. The stationary iron core 68 having a through bore 68a is fitted into a bore 93 at the bottom of U-like-shaped frame 72 and calked thereto, the movable rod 71 being longer in length than the iron core 68 and slidably inserted through the through bore 68a. The coil bobbin 67 has at one end a smaller diameter portion 94 which is fitted into a mounting bore 95 formed at the attachment plate 73, and is fitted at the other end onto the stationary iron core 68. The plunger 70 is fitted slidably into the coil bobbin 67 and a forcible-contact-opening rod 96 extending from one end of plunger 70 projects outwardly from the smaller diameter portion 94 at the coil bobbin 67, so that a flange 97 at the utmost end of rod 96 perforates through a larger diameter portion of keyhole-shaped bore 62 and is positioned in a slot thereof. The return spring [96] *69* is compressed across the stationary iron core 68 and plunger 70. In the above construction, the electromagnet unit 44, when a rated current of coil 66 or an excess current merely flows therein, restricts movement of plunger 70 by the spring force of return spring 69, but when a short-circuit current flows, the magnetic flux between the stationary iron core 68 and the plunger 70 increases to overcome the return spring 69, whereby the plunger 70 is attracted to the stationary iron core [63] *68* and moves thereto. Hence, the movable rod 71 is pushed by the plunger 70 and projects outwardly from the U-like-shaped frame 72 and the flange 97 of forcible-contact-opening rod 96 is retained at the slot side of bore 62 to thereby operate to pull the movable contact plate 57.

The bimetal 45, as shown in FIGS. 5 and 6, is bent in an about L-like shape and comprises horizontal and slant segments, the slant segment having at the upper end a gap adjusting screw 100 threaded therewith, the horizontal segment 98 having a adhesive bore (not shown) through which the bimetal 45 is secured to the lower end of side plate 82, the bimetal 45 and coil 66 being weld-connected by a flexible copper wire 101, the side plate 82 and movable contact plate 57 being weld-connected by a flexible copper wire 102. The bimetal 45, when a current flows therein, curved at the slant segment away from the terminal unit 20, the curving operation being set to be done by an excess current several times as large as the rated current.

In the above construction, the power source side terminal unit 21 and load side terminal unit 20 are connected through the connecting copper strand wire 56, stationary contact plate [57] *53*, copper strand wire 102, frame side plate 82, bimetal 45, copper strand wire 101 and coil 66 in the order, and the circuit is on-off controlled by the contact unit 43. The arc extinguish chamber 51, during the short-circuit cut-off, allows the arc generated at the contact unit 43 to rapidly leave between the contacts 46 and 47 and disappear, and mainly comprises an exhaust outlet 103, arc-chute plates 84 and 104, a deion grid 105 and an exhaust plate 106. When the contacts 46 and 47, during the short-circuiting, are disconnected to generate arc therebetween, since the current flowing route including the arc is U-like-shaped by the stationary contact plate 53, stationary contact 46, arc, movable contact 47, and movable contact plate 57, an electromagnetic force is generated for driving the arc toward the grid 105 side. Hence, the arc leaves the contacts 46 and 47, runs on the arc-chute plates 84 and 104, then approaches the deion grid 105 to be attracted thereto, enters therein, is divided and cooled by the deion grid 105, and leads to extinction, so that the gas therefrom is exhausted to the exterior through the exhaust outlet 103.

Next, explanation will be given on the mechanism 78 for turning on or off, tripping, and resetting the movable contactor 43. The mechanism 78, as shown in FIGS. 6 and 7, comprises a trip link 109, a latch link 64, an operating link 110, a handle 111 and an operating electromagnet unit 112, the trip link 109 comprising an upright segment 113, a side segment 114 and an ear-like segment 115, the side segment 114 and ear-like segment 115 having shaft bores 116 respectively, so that a pin 87 is inserted through bores 91 at the side frame 79 and side plate 82 at the bimetal 45 side thereof and pivoted at both ends into support bores 89 formed at the body casing 1 and inner casing 2. The upright segment 113 at the trip link 109, as shown in FIG. 5, is positioned at the lower end ahead of movable rod 71 at the plunger type electromagnet unit 44 and at the upper end in front of gap adjusting screw 100 at the bimetal 45, the side segment 114 rising slantwise upwardly and forming at the slantwise upper side of the upper end thereof a downward hooked portion 119 and at the upper edge a circular-arc surface 120. A twisted coil spring 121 for restoration is fitted onto the pin 87 at the trip link 109 and retained at one end 121a to the slantwise lower edge of side segment 114 and retained at the other end in abutment against the upper segment of yoke 65. Hence, the trip link 109 is urged rotably counterclockwise in FIG. 5 and the lower end of upright segment 113 abuts against the end of movable rod 71 so as to be retainable to the projecting face of stationary iron core 68.

The latch link 64 comprises a pair of elongate side segments 122 and 123 connected through a bridge segment 124 and has bores 125 through a which is inserted a pin 88 inserted through the bores 92 at the side frame 79 and side plate 82 and pivoted at both ends to the support bores 90 at the body casing 1 and inner casing 2, the pin 88 supporting a twisted coil return spring 127. The coil spring 127 is retained at one end to the upper segment of yoke 65 and at the other ends to the lower side edges of side segments 122 and 123, so that the latch link 64 is adapted to be biased rotatably clockwise in FIG. 7 by a spring force of spring 127 and retainable at the lower end to the upper edge of attachment plate 73.

The upper end of latch link 64 intercrosses with that of trip link 109 and a latch 128 at the lower end of bridge segment 124 is positioned above the path of turning of hooked portion 119 at the trip link 109. Hence, when the latch link 64 is turned leftwardly against the spring force of twisted coil spring 127, the latch 128 slides on the circular arc face 120 at the trip link 109 to thereby allow the trip link 109 to rotate rightwardly against the spring force of twisted coil spring 127 and retain the latch 128 to the hooked portion 119.

Accordingly, the trip link 109 and latch link 64 are put in the reset condition, the trip link 109 being kept in the position where the bimetal adjusting screw 100 and movable rod 71 are detected by the upright segment 113. When the trip link 109 operates, the latch link 64 is released therefrom and put in the trip condition. Also, the pin 63 for supporting the movable contactor 43 is pivotally supported into the bores 129 at the lower end of latch link 64.

The handle 111 is formed of an insulating material and inserted into a handle-insertion cutout 130a at the top plate 11a of inner casing 2 and into a handle-insertion slot 130b at the upper cover 4 so as to be supported rotatably through a shaft 131 pivoted into bores 131a at the body casing 1 and inner casing 2. Also, the handle 111 has on display plates 111b each in a circular arc projecting from both sides and is provided at the lower end with a connection bore 133 and at the right hand with an arm 134 projecting substantially horizontally, the arm 134 having a plunger-connecting bore 135 (in FIG. 8). Thus, when the breaker is turned on by the handle 111, the letters "ON" at the display plate 111b is read through the handle slot 130b, and when off, "OFF" is read through the off display plate 111b, thereby confirming on or off of the breaker.

The operating link 110 is formed of a H-like-shaped plate bent at both sides in the same directions and comprises both sides segments 136 and a bridge segment 137, the both side segments 136 being connected at one ends to the connecting bore 133 through a pivot pin 138 and at the other ends to the pivot pin 60 supporting the movable contact plate 57 and contact frame 58.

Figure 9:
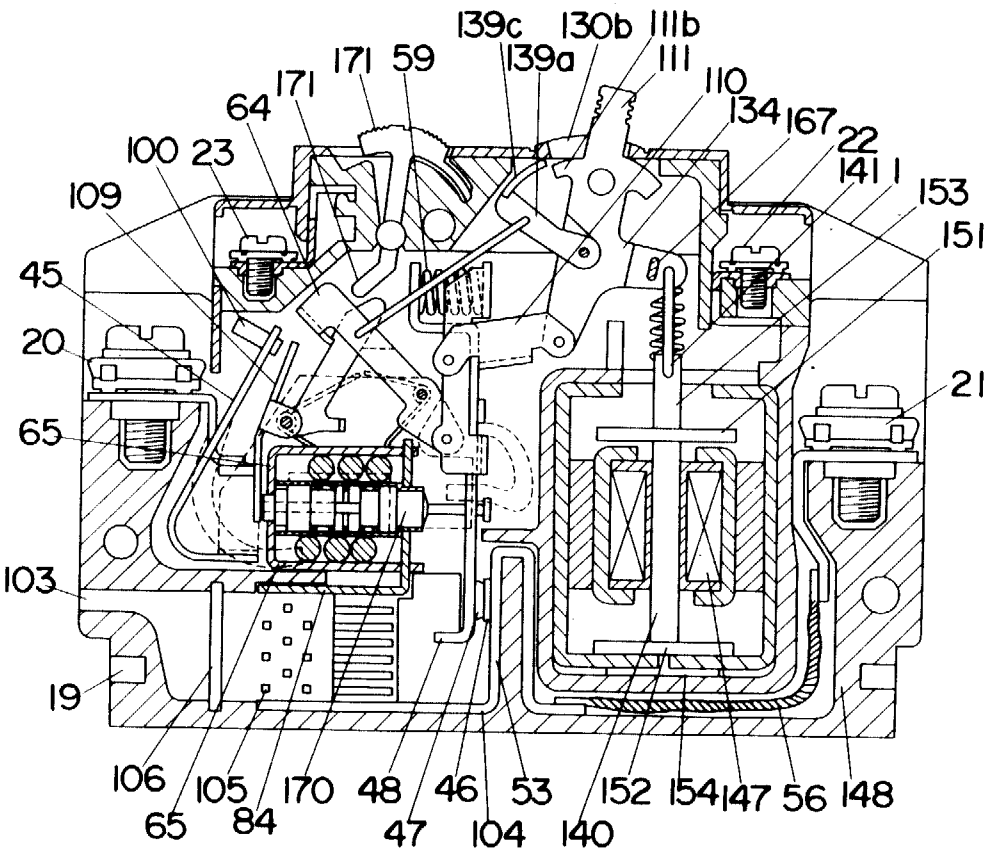
FIG. 9 is a partially sectional side view of the FIG. 1 embodiment in the on-condition.
Figure 10:
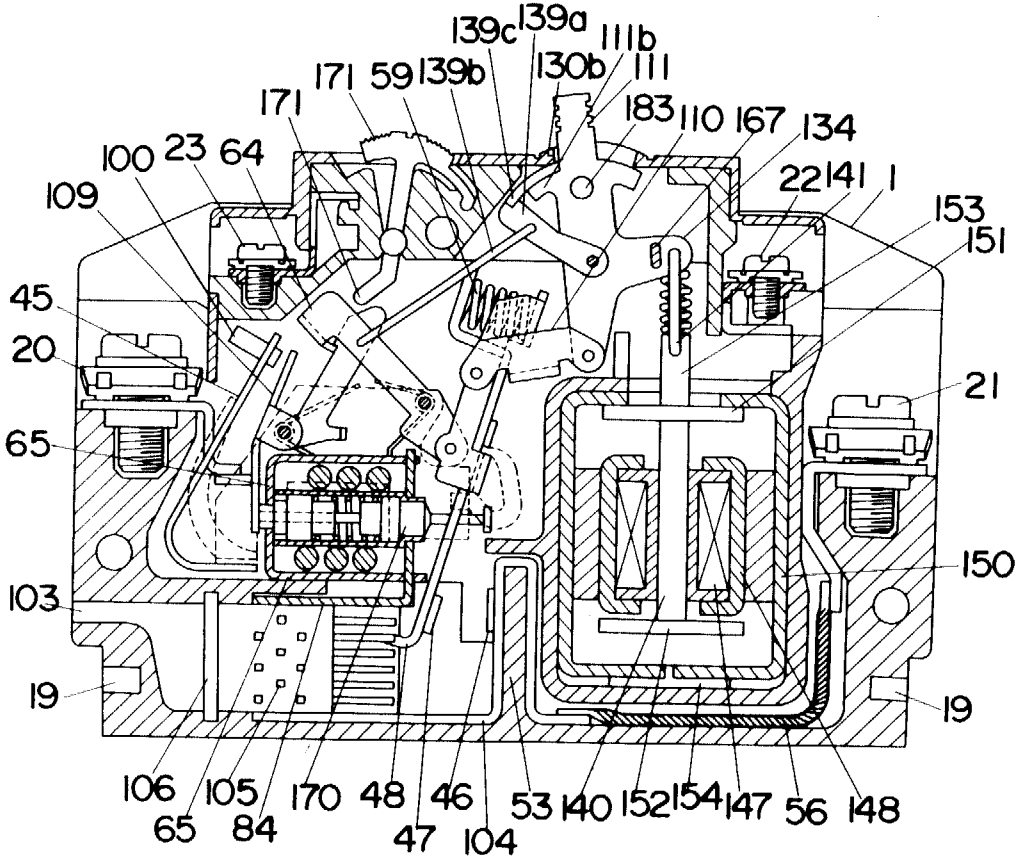
FIG. 10 is a partially sectional side view of the FIG. 9 embodiment in the off-condition.

Now, the handle 111 in FIG. 9 is turned rightwardly and put in the on-condition to thereby push leftwardly the movable contactor 48 through the operating link 110. Since the latch link 64 is latched to the trip link 109, the movable contactor 48 turns around the pin 63 to bring the movable contact 47 into contact with the stationary contact 46. When the handle 111 further is turned to the predetermined position, the movable frame 57 now turns around the pin 60 because both the contacts 47 and 46 are in contact with each other to compress the compression spring 59, thereby applying the contact pressure to the contact unit 43 and keeping the breaker on by use of operating electromagnet unit 112 to be discussed below. On the other hand, FIG. 10 shows that the handle 11 is turned leftwardly and the breaker is off, in which the movable contactor 48 also turns clockwise around the pin 63 by being pulled at the upper end through the operating link 110, thereby disconnecting the movable contact 47 from the stationary contact 46, thus turning the breaker off. The off-operation, if after trip-operation, resets the latch link 64. In other words, in a trip-free condition, the latch link 64 is released from the trip link 109 and turns around the pin 120 by the spring 127, thereby being put in condition shown in FIGS. 11 and 12. When the handle 111 further is turned leftwardly to the regular position, the operating link 110 is more pulled to raise the movable contactor 48 as a whole toward the handle 111, whereby the latch link 64 turns leftwardly around the pin 125 against the spring 127 and the latch 128 slides along the circular arc surface 120 at the trip link 109 to be retained to the hooked portion 119.

Figure 8:
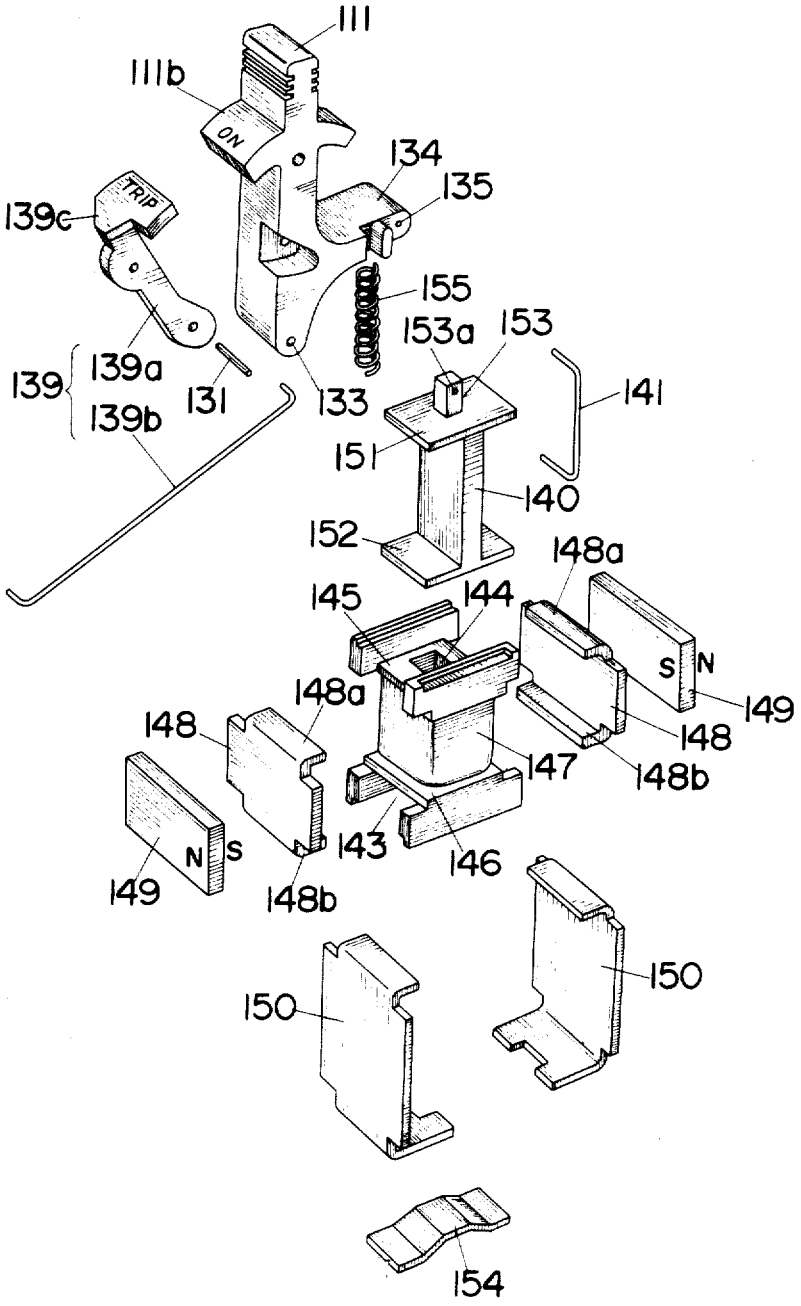
FIG. 8 is a perspective exploded view of a bistable type polarized electromagnet unit and a handle.

A trip display unit 139 carries out a trip display when the breaker is tripped by an abnormal current, and comprises a display link 139a and an interlocking link 139b as shown in FIG. 8, the display link 139a being pivoted at the lower end to the handle shaft 131 and having at the upper end a trip display panel ("TRIP" is represented on the surface) in a circular arc. The interlocking link 139b comprises a rod bent at both ends in the same direction and connects with the upper ends of display link 139a and latch link 64. The trip display unit 139, when in the reset condition, is retracted from the off-position of handle 111 as shown in [FIGS. 14 and] *FIG.* 10, but the latch link 64, when in the trip condition, turns clockwise to push the interlocking link 139b and rotates the display link 139a to thereby allow the trip display panel 139c to move to cover the on-display plate 111b (where the handle 111 is always in the on-position). As a result, the mark "TRIP" on the trip display panel 139c is read through the slot 130b and the mark "ON" is kept from sight.

The operating electromagnet unit 112, as shown in FIG. 5, is mounted in a housing 52 at the body casing 1 in a manner of keeping upwardly the plunger 140 projection side, the plunger 140 connecting at the upper end to a plunger connecting bore 135 at the handle 111 through a U-like-shaped pin 141. Also, the operating electromagnet unit 112 is of a bistable polarized type and comprises, as shown in FIG. 8, a coil frame 143 providing a rectangular through-bore 144 and upper and lower flanges 145 and 146, a coil 147, a pair of inner yokes 148 engaging with both lateral sides of coil frame 143, a pair of permanent magnets 149 (magnetic poles represented by N and S) attracted onto the outer surfaces of inner yokes 148, and a pair of outer yokes attracted to the outsides of permanent magnets 149 respectively. The plunger 140 perforates through the rectangular bore 144 at the coil frame 143 has flanges 151 and 152 positioned between the inner yokes 148 and the outer yokes 150 respectively. A connection portion 153 projects from the upper surface of flange 151 and has at the upper end an engaging bore 153a through which the U-like-shaped pin 141 is journalled. A buffer 154 is interposed between and under the lower ends of outer yokes 150 for buffering the plunger 140 when moved.

Figure 11:
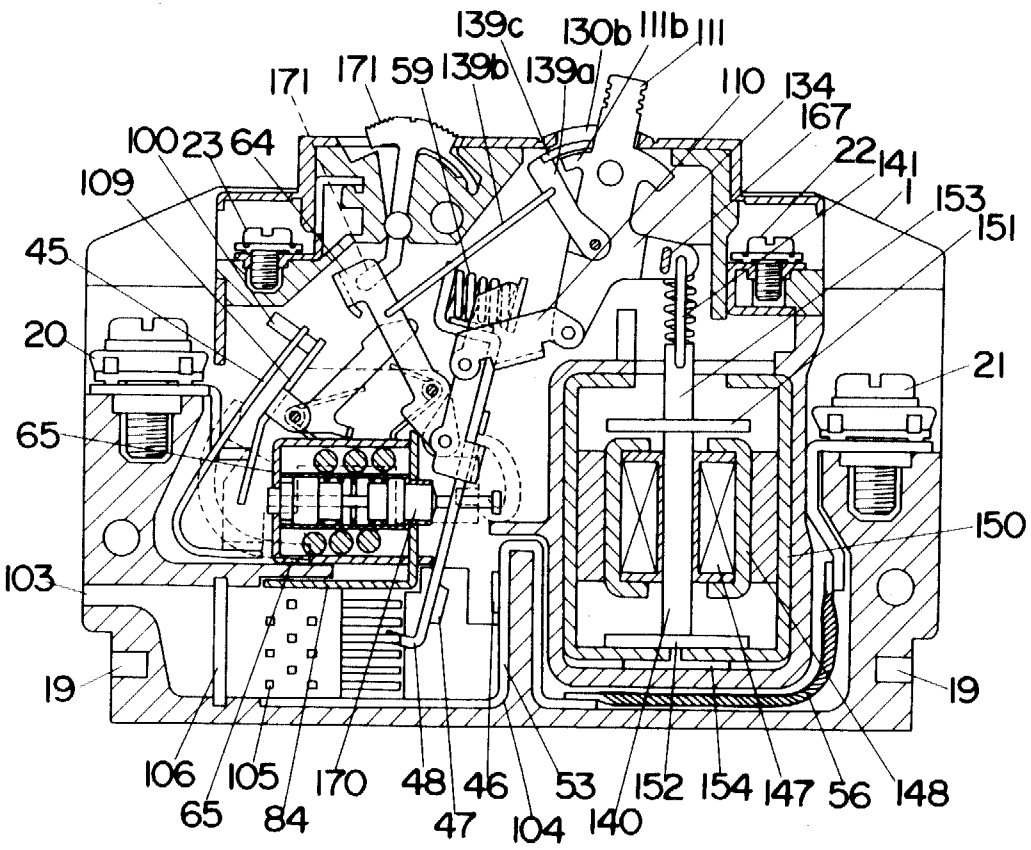
FIG. 11 is a partially sectional side view of the same in the trip condition by the bimetal.
Figure 12:
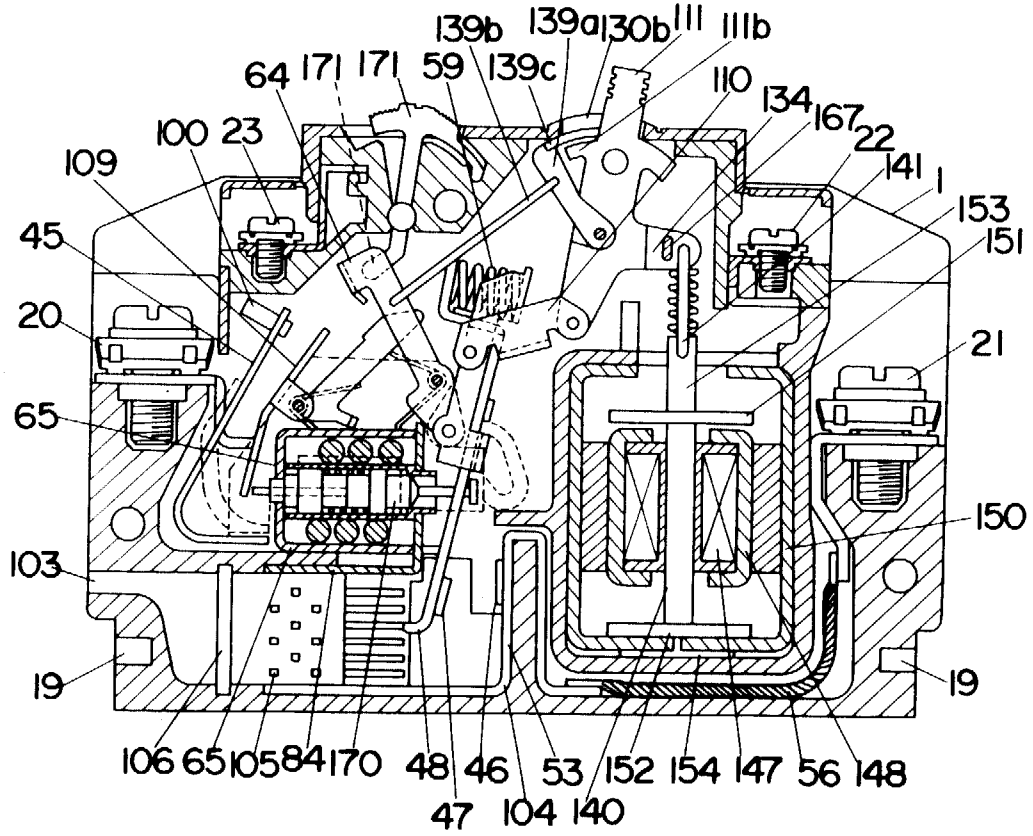
FIG. 12 is a partially sectional side view of the same in the trip condition caused by the electromagnet unit.
Figure 14:
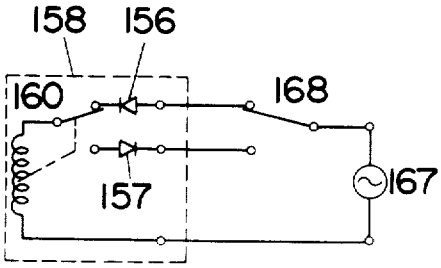
FIGS. 14(a)–(b) show circuit diagrams of a three-wire system drive for the bistable type polarized electromagnet unit; and, FIGS. 15(a)–(b) show circuit diagrams for a two-wire system drive for the same.
Figure 14:
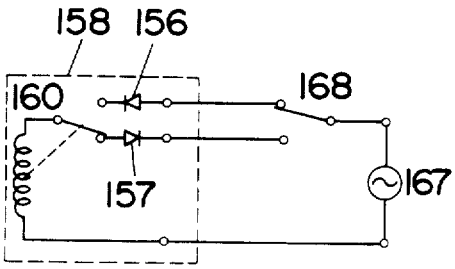

Since the permanent magnets 149, as shown in FIG. 9, are opposite to each other in the same polarity, both the upper and lower ends 148a and 148b of inner yokes 148 are magnetized in S-polarity and those of outer yokes 150 in N-polarity and are opposite to each other. Hence, the flanges 151 and 152 at the plunger 140, when positioned in either FIGS. 9 or 10, are attracted to the yokes 148 or 150 and latched thereto. A return compression spring 155 is interposed between the arm 135 at the handle 111 and the coil frame [143] *145*, a spring force of spring 155 being smaller than the attraction to the plunger 140, but acting when the handle 111 is turned on by hand-operation or the electromagnet unit 112, thereby instantly disconnecting the contacts 46 and 47. When the electromagnet unit 112 is not energized, the handle [11] *111* is hand-operated to be turned to on or off position, thereby moving the plunger 140 downwardly or upwardly and holding the same in the lower or upper position by the magnetic force of permanent magnets 149, thus holding the handle 111 in its on or off position. Hence, the movable contactor 48 is kept in contact with the stationary contact 46 with contact pressure as shown in FIG. [14] *5* or in open condition in FIG. 10. On the other hand, between the operating terminal 22 and an end of coil 147 are interposed a pair of rectifying diodes 156 and 157 and a switching contact unit 158 as shown in FIG. 14 to thereby enable AC drive of electromagnet unit 112. These components are disposed in a recess 159 formed between the inner casing 2 and the side casing 3 and at the inner casing 2 side. At first, a U-like-shaped stationary contact plate 160 is fitted onto a stationary projection 161 and a pair of switching contact plates 162 and 163 are supported into slits 165a and 165b at a support projection 164 opposite to the projection 165 in a nipped manner to thereby contact with the stationary contact plate 160 at the upper and lower surfaces thereof respectively. A bore 166 in a circular arc is formed between the stationary projection 161 and the support projection 164, and a switching contact drive lever 167 formed at one side of arm 134 at the handle 111 and integral with the arm 134 perforates the bore 166 to be positioned between the switching contacts 162 and 163, so that when the handle 111 is in on-position (FIG. 9), lever 167 disconnects the lower switching contact plate 163 from the stationary contact plate 160, and when in the off-position (FIG. 10), disconnects the upper switching contact plate 162 from the same. The coil 147 is connected at its ends to the stationary contact plate 160 and one operating terminal 22, and diodes 156 and 157 are connected at one ends to the pair of movable contact plates 162 and 163 in a manner of having reversed polarity to each other and at the other ends to the other operating terminal 22 as shown in FIG. 14. In FIG. 14, reference numeral [167] *199* designates an AC power source and 168 designates an external changeover switch. For example, when the external changeover switch is on, a unidirectional current flows in the coil 147 through the diode 156 so that the plunger 140 moves from the upper position in FIG. 10 to the lower position in FIG. 9 and is held thereat, at which time the drive lever 167 moves downwardly, whereby the movable contact plate 162 contacts with the stationary contact plate 160 and the movable contact plate 163 is disconnected therefrom to keep the electromagnet unit 112 in condition shown in FIG. 14(b). While, when the breaker is intended to be off, the external changeover switch 168 is turned off and the coil 147 is energized reversely to drive the plunger 140 upwardly and the handle 111 to the off-position, whereby the lever 167 switches the movable contact plates 162 and [162] *163*. Furthermore, in the aforesaid trip condition, the latch link 64 is released from the trip link 109 and turns by the spring 127 as shown in FIGS. 11 and 12, whereby the pin 63 turns and the movable contactor 48 turns around the pin 138 through the operating link 110. Hence, the movable contact 47 is disconnected from the stationary contact 46 without operating the plunger 153 at the electromagnet unit 112 and the handle 111, thus carrying out the trip-free operation of disconnecting the movable contact 47 from the stationary contact 46.

Figure 15:
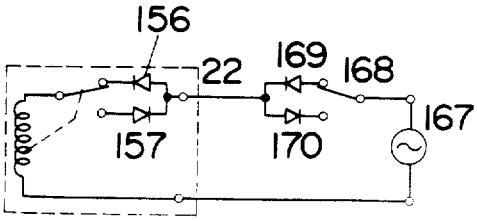
Figure 15:
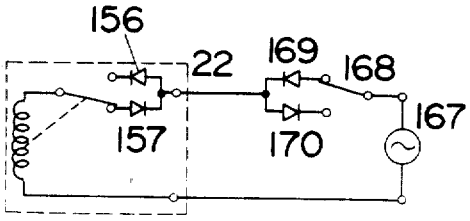

The aforesaid embodiment is for a three-wire system. In a case of the two-wire system, as shown in FIG. 15, the operating terminal need only be connected in common to the diodes 156 and 157 and the external changeover switch 168 be provided with a pair of diodes 169 and 170, and the operational principle is the same as the three-wire system. Also, it is a matter of course that DC voltage is applied to drive the electromagnet unit 112.

In addition, a trip test button 171 shown in the drawing serves to desirably test the trip operation of mechanism 78, which turns to push at the lower end 171a the slant side segment 114 at the trip link 109, whereby the trip link 109 turns rightwardly to be released from the latch link 64, thus carrying out the trip operation.

The embodiment of the invention has been described as a one-pole construction of a circuit breaker. In a case where a plurality of poles are required, the well-known means is used to juxtapose the poles substantially similar in construction, this realizing a multipolar circuit breaker.

In this case, a coil 147 of each pole at the operating electromagnet unit 112 is connected in series with each other and the operating terminal 22 is used only for one pole, so that an operation signal is given to the operating terminal 22, thereby enabling the electromagnet units 112 to simultaneously operated.

Figure 13:
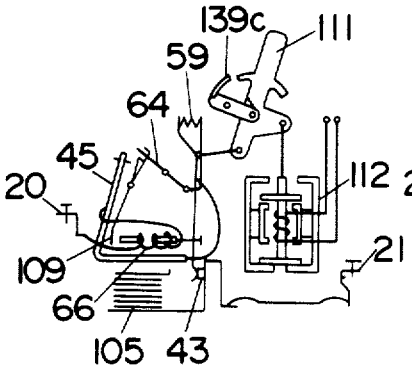
FIGS. 13(a)–(d) show operational diagrams of the FIG. 1 embodiment.
Figure 13:
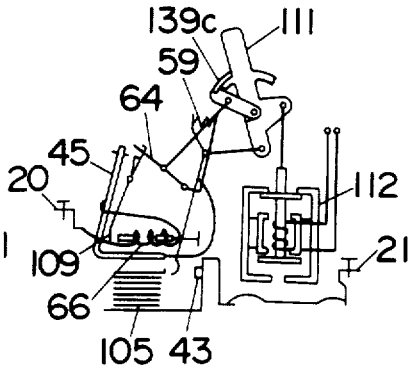
Figure 13:
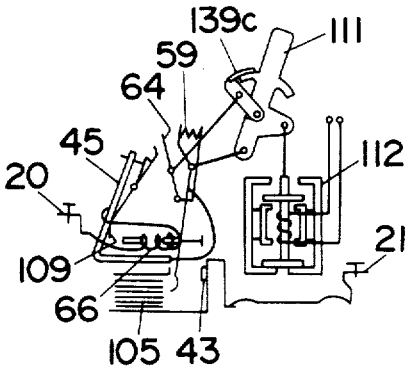
Figure 13:
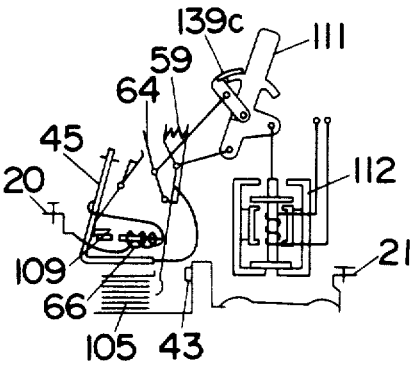

Next, explanation in summary will be given on operation of the remote control system circuit breaker of the invention. The circuit breaker in on-condition is shown in FIGS. 9 and 13-(a), in which the latch link 64 is latched by the trip link 109, the handle 111 is turned rightwardly to contact the movable contactor 48 with the stationary contact 46, and the plunger 140 at the operating electromagnet unit 112 moves downwardly to be held by the permanent magnets 149, whereby the handle 111 and movable contactor 48 are held in the on-position. In addition, this on-operation includes direct operation of handle 111 and the downward drive of plunger 140 by the signal given to the operating terminal 22.

The breaker in the off-condition is shown in FIGS. 13-(b) and 10, in which the latch link 64 is latched as the same as the above, whereby the handle 111 is turned leftwardly and the movable contactor 48 is open. Also, the plunger 140 at the operating electromagnet unit 112 moves upwardly to be held. The functional relation and operation mode are the same as the aforesaid on-condition.

An excess current trip condition is shown in FIGS. 13-(c) and 11. In FIG. 9, when the excess current flows in the circuit, the bimetal 45 is self-heated to gradually push the trip link 109 and the latch link 64 is released and turns, whereby the movable contactor pivoting pin 63 moves downwardly, and since the handle 111 is kept held by the plunger 140, the movable contact 47 is disconnected from the stationary contact 46, thus cutting off the circuit. The reset after trip operation, as aforesaid, is carried out by turning the handle 111 from the position in FIG. 11 to off-position, in which the operating link 110 pulls the movable contactor 48 upwardly so that the latch link 64 turns counterclockwise to latch the latch 128 to the hooked portion 119 at the trip link 109. Of course, the operating [terminals 15 and 16] *terminal 22* may be given signals to actuate the electromagnet unit 112 to turn the handle 111 to its off-position.

The short-circuit current trip is shown in FIGS. 13-(d) and 12. In on-condition of circuit breaker, when a short-circuit current flows in the circuit, the plunger 96 at the electromagnet unit 44 is attracted to the stationary iron core 68, so that the movable rod 71 is pushed out to push the lower end of trip link 109 and turn the trip link 109, whereby the latch link 64 is released to disconnect the movable contactor 48 from the stationary contact 46. However, before the movable contactor 48 is open by the above linkage operation, the flange 97 of forcible-opening rod 96 engages with the contact plate 57 quite simultaneously with operation of plunger 70, thereby drawing the contact plate 57 and allowing the movable contact 47 to be disconnected from the stationary contact 46. In other words, just before the latch link 64 is tripped, the contact plate 57 turns around the pin 60 to compress the contact pressure applying spring 59 to thereby disconnect the movable contact 47 from the stationary contact 46.

During the above trip operation, the display link 139a turns as the latch link 64 turns, and the trip-display panel 139c covers the on-display panel 111b to carry out the trip display.

As seen from the above, the remote control system circuit breaker of the invention is so constructed that the trip link and latch link are provided with return springs and latched respectively and the on-hold and off-hold of a movable contactor supported by the latch link and depend upon the bistable type polarized electromagnet unit, thereby being advantageous in that the electromagnet can be small-sized and power consumption is saved in comparison with the conventional one and also the use of only one electromagnet can largely miniaturize the circuit breaker.

We claim:

1. A remote control system circuit breaker having a casing and provided with an excess current detection element, comprising a trip link one end of which is pivoted rotatably and the other end of which is connected to move corresponding to said excess current detection element, a latch link engaged at one end thereof with the other end of said trip link to thereby retain said trip link in a detection position, said latch link being pivoted substantially at its center rotatably to said casing, a movable contactor pivoted at its central portion to the other end of said latch link, and an operating handle connected through an operating link to one end of said movable contactor, a movable contact at the other end of said contactor, said trip link and latch link having return springs respectively, said circuit breaker also being provided with an operating electromagnet unit which is connected to said handle and holds said handle in its on or off position.

2. The remote circuit breaker of claim 1 in which the operating handle has a portion projecting from an opening in said casing and adjacent said projecting portion is a display window; on-display and off-display plates actuated by said handle for viewing through said window; a trip display member mounted for movement toward a position for covering said on-display plate.

3. A remote control system circuit breaker according to claim 2, wherein said trip display member comprises a display link forming at the upper end thereof a trip display portion in a circular arc and pivoted at its lower end; an interlocking link connecting said display link and the upper end of said latch link, so that during the trip condition of said latch link, said display link in response to movement of said latch link moves said trip display portion onto said on-display portion at said handle.

4. A remote control system circuit breaker according to claim 1, wherein said operating electromagnet unit is provided with terminals for connecting said unit in series with other polar units when juxtaposed in use for a multipolar circuit breaker.

*5. A remote control system circuit breaker comprising: a movable contactor provided with a movable contact,*

*a stationary contact which comes into or out of contact with said movable contact,*

*an operating handle connected to said movable contactor in such a way that said movable contactor moves following the action of said handle,*

*a trip link to be driven by an excess current detection element which detects an excess current,*

*a latch link which, when engaged with said trip link, retains said movable contactor at its on or off position in response to the on or off operation of said handle and which, when disengaged from said trip link with the said handle and said movable contactor kept in the on-condition, retains said movable contactor at its off position independent of said handle's being held at its on position, and*

*a bistable type electromagnet unit having an armature which is connected to said handle, thereby retaining said handle at its on or off position in response to a remote control signal.*

* * * * *